US006538399B1

(12) United States Patent
Shimoi et al.

(10) Patent No.: US 6,538,399 B1
(45) Date of Patent: Mar. 25, 2003

(54) ELECTRON TUBE

(75) Inventors: Hideki Shimoi, Hamamatsu (JP); Hiroyuki Kyushima, Hamamatsu (JP); Yutaka Hasegawa, Hamamatsu (JP); Toshimitsu Nagai, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/701,282

(22) PCT Filed: Jun. 15, 1999

(86) PCT No.: PCT/JP99/03176

§ 371 (c)(1), (2), (4) Date: Nov. 28, 2000

(87) PCT Pub. No.: WO99/66534

PCT Pub. Date: Dec. 23, 1999

(30) Foreign Application Priority Data

Jun. 15, 1998 (JP) .......................................... 10-167019

(51) Int. Cl.[7] .................................................. G01T 1/20

(52) U.S. Cl. ....................... 315/500; 313/532; 313/533; 250/366

(58) Field of Search ................................ 313/532, 533; 250/366; 315/500

(56) References Cited

U.S. PATENT DOCUMENTS

| | | | | |
|---|---|---|---|---|
| 3,868,536 A | | 2/1975 | Enck, Jr. | |
| 3,872,337 A | | 3/1975 | Davis et al. | |
| 4,489,251 A | | 12/1984 | Beauvais | |
| 4,825,066 A | | 4/1989 | Nakamura et al. | |
| 5,744,908 A | | 4/1998 | Kyushima | |
| 6,472,664 B1 | * | 10/2002 | Kyushima et al. | 250/366 |

FOREIGN PATENT DOCUMENTS

| | | |
|---|---|---|
| JP | 48-76470 | 10/1973 |
| JP | 63-299032 | 12/1988 |
| JP | 2-291658 | 12/1990 |
| JP | 7-94139 | 4/1995 |
| JP | 09-288992 | 11/1997 |
| JP | 9-288992 | 11/1997 |
| JP | 10-144251 | 5/1998 |
| SU | 993361 | 1/1983 |

* cited by examiner

*Primary Examiner*—David Vu
(74) *Attorney, Agent, or Firm*—Oliff & Berridge, PLC

(57) ABSTRACT

To prevent the deterioration in sensitivity of the photocathode (20) of an electron tube and maintain stable output for a long time, an ion confining electrode (22) and an ion trap electrode (23) are provided between the photocathode (20) and a first stage dynode (24*a*). The potential of the ion confining electrode (22) is set higher than that of the first stage dynode (24*a*), while the potential of the ion trap electrode (23) is set equal to or higher than that of the photocathode (20) and lower than that of the first stage dynode 24*a*. Since the feedback to the photocathode (20) of the positive ions generated in the vicinity of the first stage dynode can be effectively suppressed, the sensitivity of the photocathode (20) is prevented from decreasing, and stable output is maintained for a long time.

9 Claims, 6 Drawing Sheets

ELECTRON TUBE

TECHNICAL FIELD

The present invention relates to an electron tube provided with a photocathode for emitting electrons in response to incident light through the photoelectric conversion, and an electron multiplying section for multiplying the emitted electron flow through the emission of secondary electrons.

BACKGROUND ART

A photomultiplier tube, which is one of electron tubes, is used widely for various measurements in such fields as nuclear high-energy physics and nuclear medicine.

FIGS. 1(*a*) and 1(*b*) show an example of a conventional photomultiplier tube, including a top view and a cross-sectional view respectively. This photomultiplier tube includes a circular faceplate 11 for receiving incident light; a photocathode 20 formed on the inner surface of the faceplate 11 and held at zero potential; and an electron multiplying section 24 including a plurality of stages of dynodes 24*a*–24*n*. The first stage through m$^{th}$ stage dynodes 24*a*–24*m* are arranged in continuous stages. An anode 26 is positioned beneath the m$^{th}$ stage dynode 24*m*. The final stage dynode 24*n* is disposed directly beneath the anode 26. The first stage dynode 24*a* has a positive potential in relation to the photocathode 20. Electrons emitted from the photocathode 20 impinge on the first stage dynode 24*a*. The dynodes 24*a*–24*m* are formed with a plurality of electron multiplying apertures arranged in a matrix pattern. A focusing electrode 21 is formed with an electron focusing section 21*a,* disposed between the photocathode 20 and the electron multiplying section 24, and maintain at the same potential as that of the photocathode 20. Accordingly, photoelectrons emitted from the photocathode 20 are converged by the electron focusing section 21*a* and subsequently emitted onto a prescribed area of the first stage dynode 24*a*.

In this type of conventional photomultiplier tube, however, the sensitivity of the photocathode deteriorates after a long period of use. As a result, the output from the photomultiplier tube in response to incident, light declines. This type of problem is particularly prevalent in photomultiplier tubes using a semiconductor photocathode, such as gallium arsenic (GaAs).

DISCLOSURE OF THE INVENTION

In view of the foregoing, it is an object of the present invention to provide an electron tube that has a photocathode and an electron multiplying section and is capable of preventing the deterioration of the photocathode to maintain a stable output over a long period of use.

To achieve these objectives, the inventors investigated the causes for deterioration in the photocathode. They discovered that positive ions were generated by the collision of electrons with a cesium (Cs) cloud formed around. the electron impinging section nearest the photocathode. The positive electrons were accelerated toward the photocathode due to the electric, field present at the site of their generation, resulting in ion feedback colliding with the photocathode. The inventors discovered that this collision caused the photocathode to deteriorate.

It should be noted that the potential of electrodes is defined by the positive or negative potential differential between electrodes rather than the absolute value of potential. In other words, when electrode A has a positive potential in relation to electrode B, the potential of the electrode A is higher than that of the electrode B.

According to one aspect of the present invention, an electron tube includes a photocathode that emits electrons in response to incident light through the photoelectric conversion; an electron multiplying section that multiplies electrons emitted from the photocathode, the electron multiplying section including an electron impinging section positioned nearest the photocathode, wherein the electrons emitted from the photocathode impinge on the electron impinging section; an ion confining electrode provided between the photocathode and the electron multiplying section for confining positive ions generated in the electron multiplying section; and an ion trap electrode provided between the ion confining electrode and the electron impinging section for capturing the positive ions confined by the ion confining electrode. The potential of the electron impinging section is set higher than the potential of the ion confining electrode. The potential of the ion trap electrode is set equal to or greater than the potential of the photocathode and lower than the potential of the electron impinging section.

In this type of electron tube, external light striking on the photocathode is converted to photoelectrons, which are accelerated toward the ion confining electrode having a positive potential in relation to the photocathode. After passing through apertures formed in the ion confining electrode and the ion trap electrode, the photoelectrons strike the electron impinging section of the electron multiplying section. At this time, positive ions are generated near the electron impinging section.

With the electrode configuration of the present invention, the generated positive ions are accelerated toward the photocathode. However, since the ion confining electrode has a positive potential in relation to the electron impinging section, the positive ions cannot pass through the apertures in the ion confining electrode to reach the photocathode. Ultimately, the positive ions are captured by the ion trap electrode which is set at a lower potential than the potential of the ion confining electrode and the electron impinging section, or by the electron impinging section itself, thereby preventing deterioration of the photocathode.

The potential of the ion confining electrode is set higher, within a range in which photoelectron converging from the photocathode to the electron multiplying section is not lost, than that of the electron impinging section at which positive ions are generated. Accordingly, ion feedback and deterioration of the photocathode caused thereby can be effectively suppressed without reducing the photoelectron capturing efficiency.

According to another aspect of the present invention, the electron multiplying section includes a plurality of stages of dynodes for capturing and orderly multiplying the electrons emitted from the photocathode. Here, the first stage dynode functions as the electron impinging section. According to another aspect of the present invention, the electron multiplying section is a microchannel plate having a plate structure formed of a plurality of bundled glass pipes. In this case, the microchannel plate is disposed so that one surface opposes the photocathode to serve as the electron impinging section. The electrons multiplied by the electron multiplying section are output from the anode electrode in the form of an electric current.

The present invention is particularly effective for electron tubes including a photocathode formed from a semiconductor photoelectric conversion material, such as gallium arsenic. However, deterioration of the photocathode caused by ion feedback commonly occurs in electron tubes using other types of photocathodes and affects the life span of such photocathode. Accordingly, the electrode configuration and potential settings of each electrode of the present invention are also effective for electron tubes using photocathodes formed from materials other than semiconductor materials.

According to another aspect of the present invention, the electron tube further includes a focusing electrode disposed between the photocathode and the ion confining electrode for converging the electrons.

According to still another aspect of the present invention, the ion confining electrode and the ion trap electrode can be formed with a row of a plurality of slits for allowing photoelectrons to pass therethrough. Alternatively, the ion confining electrode and the ion trap electrode can be formed with a plurality of channels arranged in a matrix pattern to allow photoelectrons to pass therethrough.

BRIEF DESCRIPTION OF THE DRAWINGS

FIG. 1(*b*) is a cross-sectional view of the conventional photomultiplier tube;

BEST MODE FOR CARRYING OUT THE INVENTION

Figure 1:
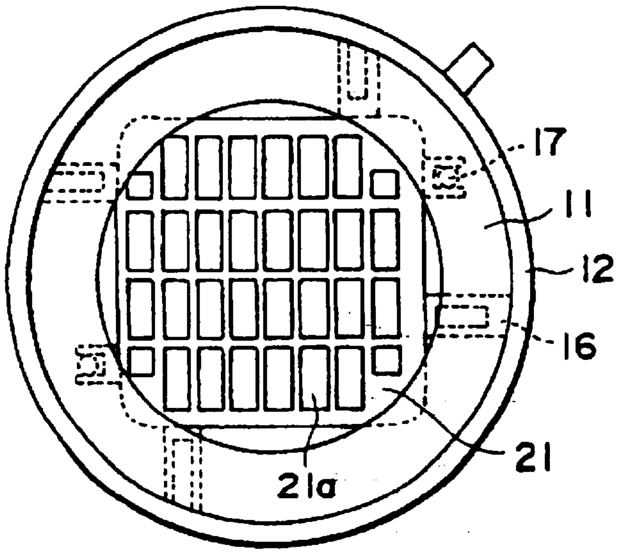
Prior Art FIG. 1 (a)
FIG. 1(*a*) is a top view of a conventional photomultiplier tube.
Figure 1:
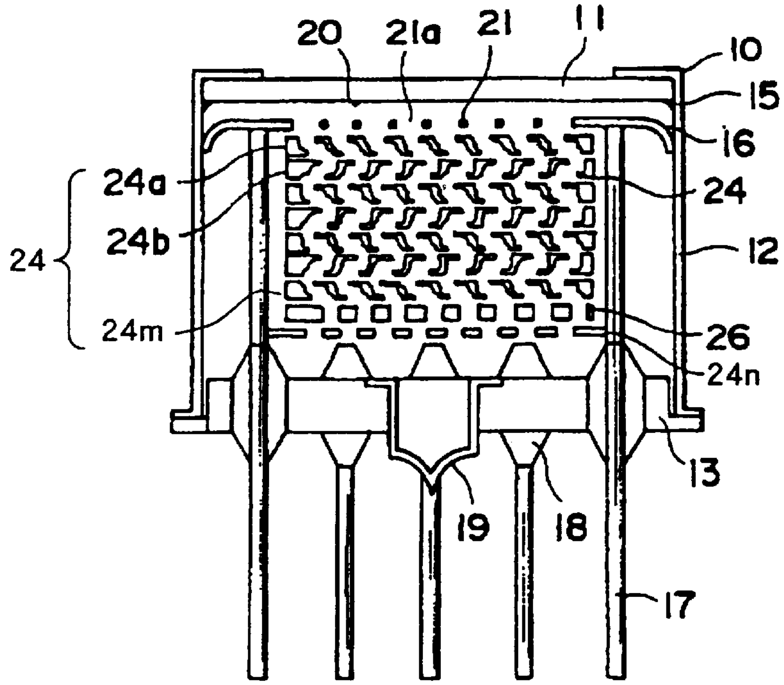
Prior Art FIG. 1 (b)

A photomultiplier tube according to a preferred embodiment of the present invention will be described while referring to the accompanying drawings, wherein parts and components similar to the conventional apparatus described above are designated by the same reference numerals to avoid duplicating description. Dimensional proportions in the drawings may not always conform to the description.

Figure 2:
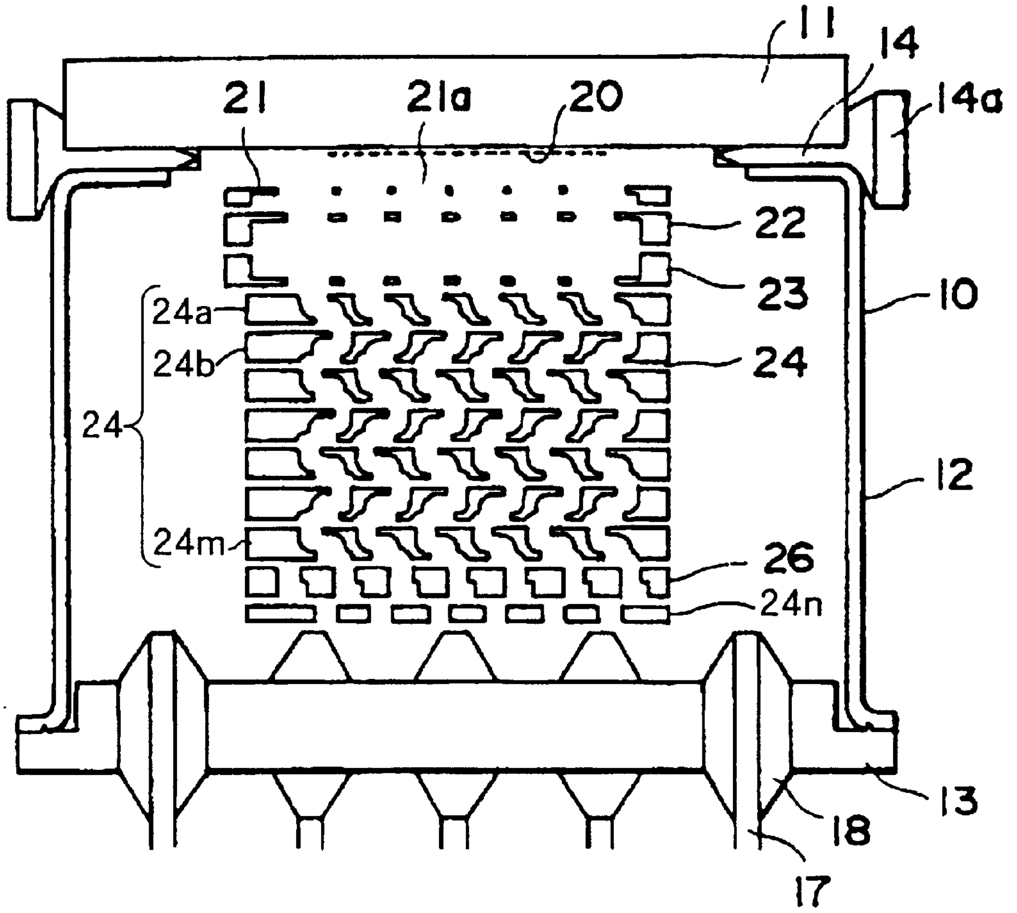
FIG. 2 is a cross-sectional view showing the configuration of a photomultiplier tube according to an embodiment of the present invention.

FIG. 2 is a cross-sectional view showing the photomultiplier tube according to the preferred embodiment of the present invention. This photomultiplier tube includes a vacuum vessel 10 and an electron multiplying section 24 having a plurality of dynodes 24*a*–24*n* disposed inside the vacuum vessel 10. The vacuum vessel 10 includes a circular faceplate 11 for receiving incident light, a cylindrical metal side tube 12 positioned on the periphery of the faceplate 11, and a circular stem 13 forming a base section.

A semiconductor photocathode 20 formed from GaAs is formed on the bottom inner surface of the faceplate 11, and is maintained at zero potential. The faceplate 11 and the metal side tube 12 are joined together using a cold sealing method by an indium seal 14 in order to prevent thermal damage on the GaAs photocathode 20 during assembly. The indium seal 14 is retained by a retaining ring 14*a* disposed therearound.

The electron multiplying section 24 includes metal channel dynodes stacked in seven stages. The metal channel dynodes have a secondary electron emitting surface formed on a prescribed region of a square planar metallic surface. The dynodes 24*a*–24*m* are formed with a plurality of electron multiplying apertures having a slit shape. An anode 26 and the final stage dynode 24*n* are disposed in this order below the stacked dynodes 24*a*–24*m*. The final dynode 24*n* is a square metal plate with slits formed therein. The slits formed in the final dynode 24*n* are positioned directly beneath grids of the anode electrode 26. Electron multiplying surfaces formed between the slits in the final stage dynode 24*n* are positioned directly beneath the slit portions formed in the anode 26. By positioning the final dynode 24*n* below the anode electrode 26, the anode electrode 26 is able to read secondary electrons reflected off the final dynode 24*n*.

A focusing electrode 21 having an electron focusing section 21*a* that is formed with a plurality of slit-shaped apertures, is disposed between the photocathode 20 and the first stage dynode 24*a*. The focusing electrode 21 is maintained at the same potential as the potential of the photocathode 20. Accordingly, photoelectrons emitted from the photocathode 20 are converged by the affect of the electron focusing section 21*a* impinged on a prescribed region of the first dynode 24*a*.

A special feature of the present embodiment is an ion confining electrode 22 and an ion trap electrode 23 disposed between the focusing electrode 21 and the first stage dynode 24*a*.

Figure 3:
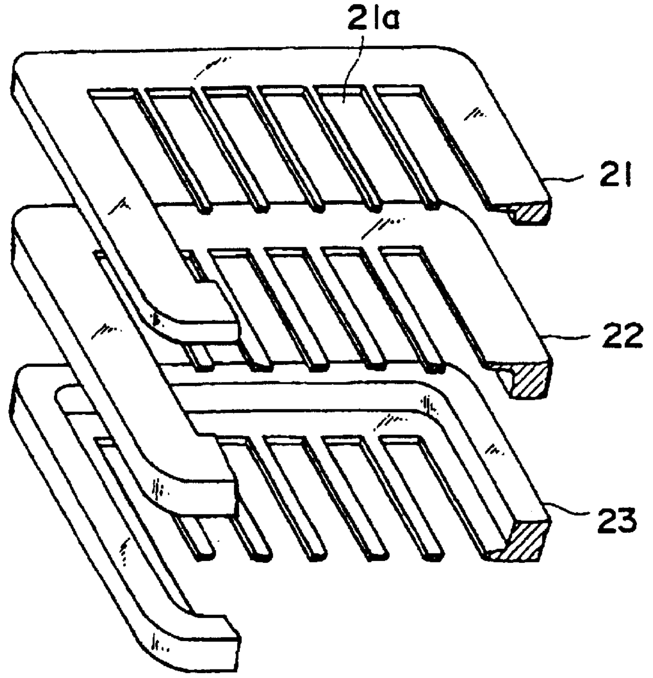
FIG. 3 is a perspective partial view showing an aperture configuration of a focusing electrode, an ion confining, electrode, and an ion trap electrode in the photomultiplier tube of FIG. 2.

FIG. 3 is a perspective partial view showing an aperture configuration of the focusing electrode 21, the ion confining electrode 22, and the ion trap electrode 23. The ion confining electrode 22 and the ion trap electrode 23 also are formed with a plurality of slit-shaped apertures corresponding to the slit-shaped apertures of the focusing. electrode 21 forming the electron focusing section 21*a*. It should be noted that configurations other than the aperture configuration, such as that for stacking and holding the contact terminals and electrodes, are omitted from FIG. 3.

Pins 17 connected to an external voltage terminal penetrate the stem 13 which serves as the base portion, for applying prescribed voltages to the focusing electrode 21, each dynode 24*a*, 24*b*, the ion confining electrode 22, and the ion trap electrode 23. Each pin 17 is fixed to the stem 13 by tapered hermetic glass 18.

Figure 4:
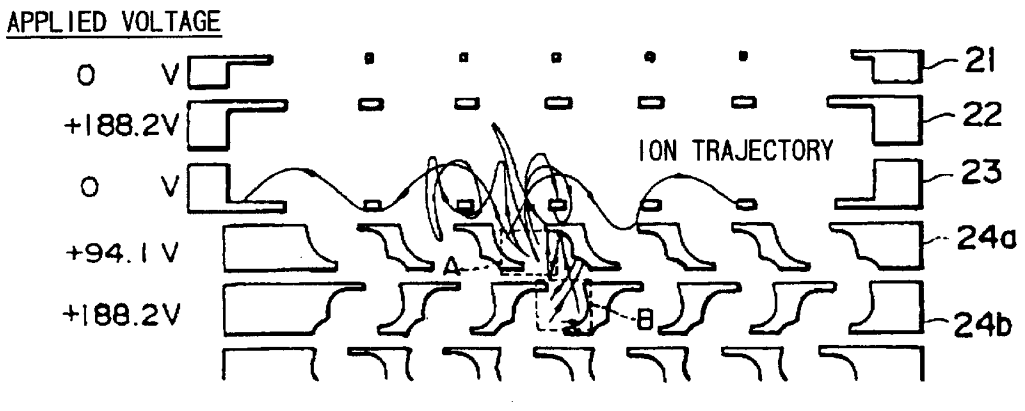
FIG. 4 is a cross-sectional view showing an example of a potential of each electrode and a calculated trajectory of positive ions between electrodes in the photomultiplier tube of FIG. 2.

FIG. 4 shows the potentials set for the focusing electrode 21, the ion confining electrode 22, the ion trap electrode 23, the first stage dynode 24*a*, and the second stage dynode 24*b*. The focusing electrode 21 is set at zero potential, the same as that for the photocathode 20. Voltages of 94.1 V and 188.2 V are applied to the first stage dynode 24*a* and the second stage dynode 24*b*, respectively. The potential of the ion trap electrode 23 is set to zero which is equal to that of the photocathode 20. A voltage of 188.2 V, which is higher than the voltage applied to the second stage dynode 24*b*, is applied to the ion confining electrode 22. In the present embodiment, by setting the potential of the ion confining electrode 22 equal to that of the second stage dynode 24*b*, it is possible to apply the necessary potential without increasing the number of the pins 17.

FIG. 4 also shows an example of a calculated trajectory of the positive ions generated in the electron multiplying section 24 for when the potentials of the electrodes are set as described above. In regards to the mechanism for generating positive ions that initiate ion feedback, it is speculated that gas molecules adsorbed by the secondary electron emission surface of the first stage dynode 24*a* are emitted when photoelectrons impinge on the first stage dynode 24*a*. Then, these gas molecules collide with photoelectrons or secondary electrons, thereby generating positive ions.

In the electrode configuration described above, positive ions generated near the first stage dynode 24*a,* indicated by a region A in FIG. 4, are potentially restrained by the ion confining electrode 22 and ultimately absorbed by the ion trap electrode 23 and the electron multiplying section 24 itself. As a result, the positive ions do not reach the photocathode.

In terms of electron flow, it can be thought that a greater number of positive ions are generated near the dynodes from the second stage on. FIG. 4 also shows a calculated trajectory of positive ions generated near the second dynode 24*b*, indicated by a region B in FIG. 4. However, these positive ions are absorbed by the dynode at the previous stage, in this case the first stage dynode 24*a* and the second stage dynode 24*b* itself. Accordingly, it is speculated that positive ions generated near the dynodes from the second stage on do not contribute to ion, feedback in the conventional photomultiplier tube and consequently do not contribute to the deterioration of the photocathode caused by the ion feedback. Accordingly, it is possible to sufficiently suppress ion feedback by setting the potential of the ion confining electrode 22 higher than that of the first stage dynode 24*a*.

Figure 5:
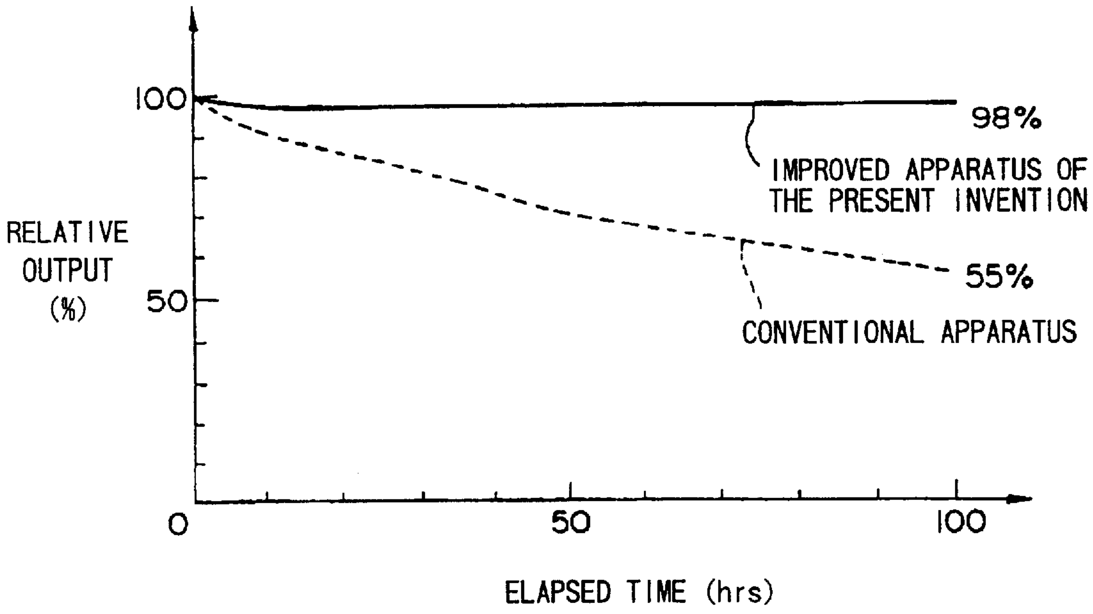
FIG. 5 is a graph-comparing changes in relative output over time of the photomultiplier tube according to the present invention and a conventional apparatus.

FIG. 5 shows the change in characteristics over time of the relative output of the photomultiplier tube according to the present embodiment having the configuration described above in comparison with that of a conventional photomultiplier tube including a GaAs semiconductor photocathode but no ion confining electrode nor ion trap electrode. As shown in the graph, the output of the conventional apparatus declines to 55% after 100 hours of operation. However, the output from the improved model of the present invention is at 98% after 100 hours, and shows almost no decline in output caused by deterioration of the photocathode. Hence, the apparatus of the present invention demonstrates extremely stable properties over a long period of use.

The present invention is not limited to the abovedescribed embodiment, and can be applied to a variety of different types of electron tube. It should be noted that the electron tube of the present invention is constructed with a photocathode in a space defined by a faceplate, a side tube, and a stem. Hence, in addition to the photomultiplier tube, this type of electron tube includes an image tube and the like. The image tube is an electron tube that converts an optical image on a photocathode to a photoelectron image through the photoelectric conversion. The photoelectron image is accelerated and converged through an electron lens system, multiplied by an electron multiplying section, and emitted onto a fluorescent surface to reproduce an optical image.

Figure 6:
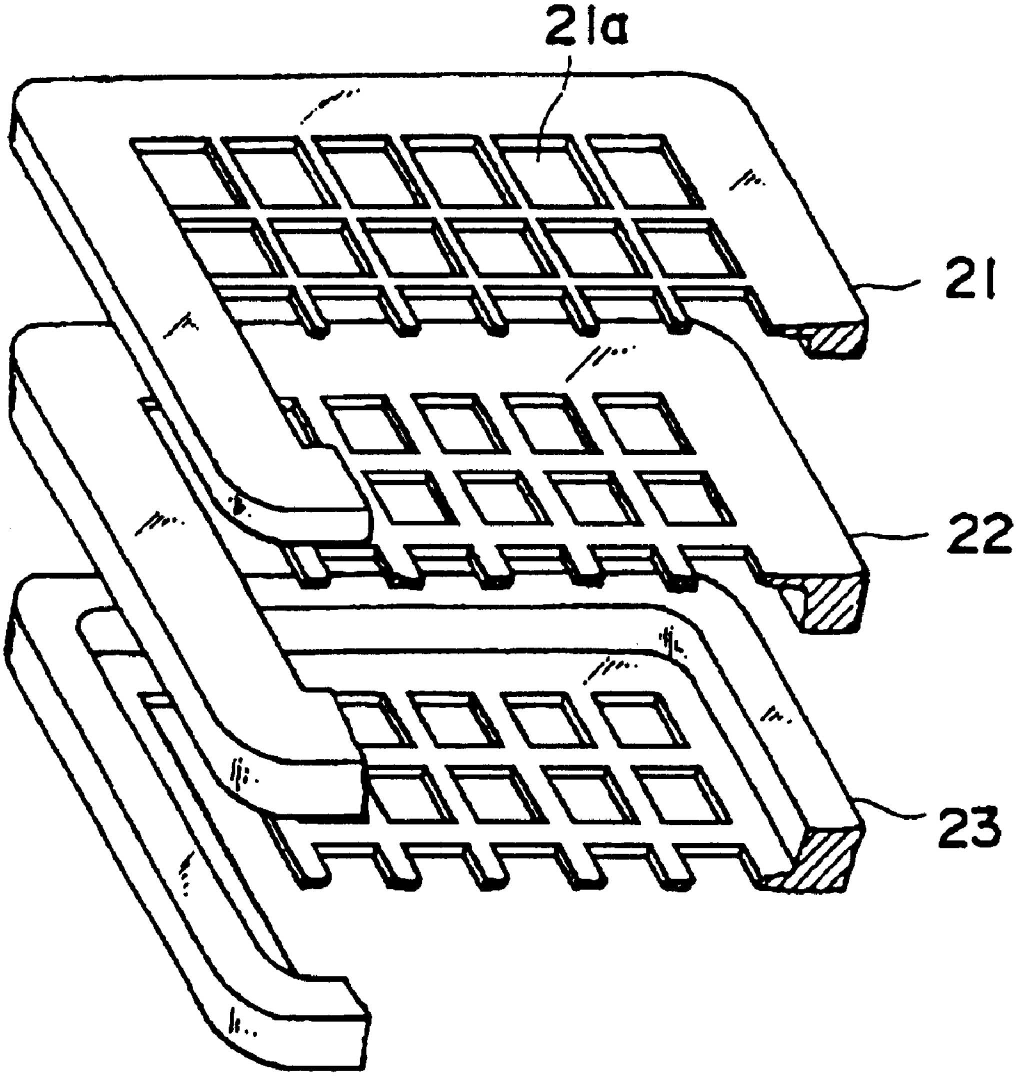
FIG. 6 is a perspective view showing another configuration of a focusing electrode, an ion-confining electrode, and an ion trap electrode of the photomultiplier tube.

In the embodiment described above, the metal channel dynodes each formed with a plurality of electron multiplying apertures in a slit shape are used. However, metal channel dynodes formed with a plurality of electron multiplying apertures can be used. In this case, as shown in FIG. 6, the aperture configuration of the focusing electrode, the ion confining electrode, and the ion trap electrode forms a matrix pattern corresponding to the dynodes. The same effects can be achieved in dynodes other than metal channel dynodes, such as dynodes that do not have a plurality of electron multiplying apertures in each dynode stage and those formed with a secondary electron emission surface on a prescribed region of a ceramic surface, for example.

Figure 7:
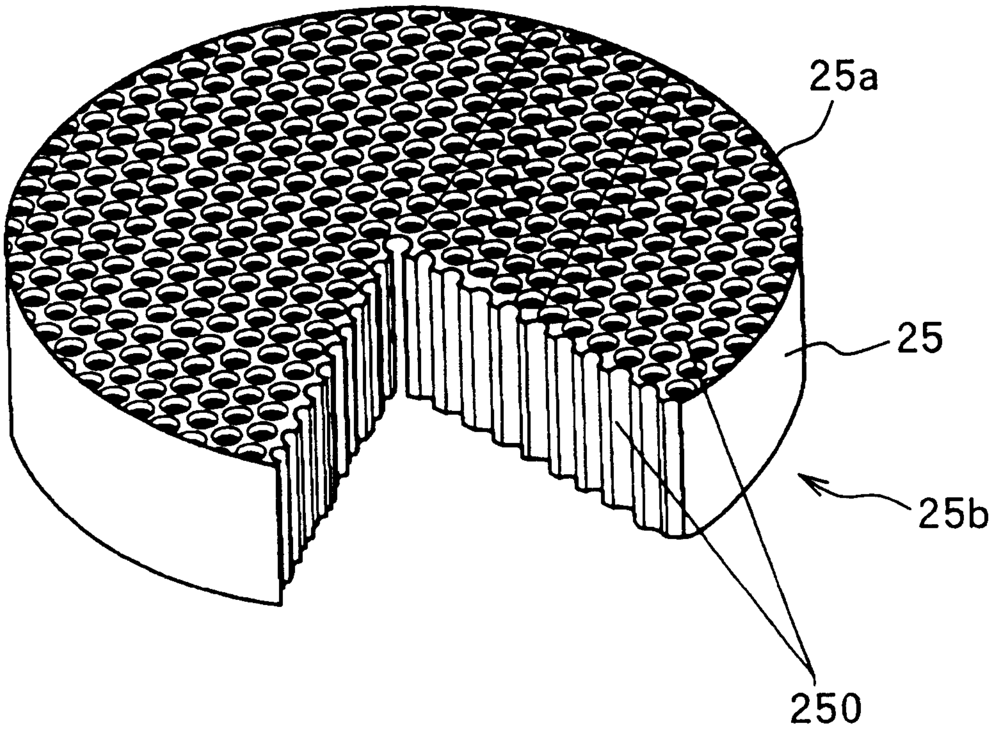
FIG. 7 is a perspective partial view showing configuration of a microchannel plate.

The focusing electrode is used in the embodiment described above. However, the same effects can be achieved in a photomultiplier tube or image tube using a microchannel plate and not a focusing electrode. As shown in FIG. 7, a microchannel plate 25 is formed in a plate structure with a bundle of micro glass pipes 250. The inner surfaces of the micro glass pipes 250 serve as the secondary electron emission surface. An electron impinging surface 25*a* on one side of the microchannel plate 25 opposes the photocathode, while an electron outgoing surface 25*b* on the other side is disposed in opposition to an anode electrode. The microchannel plate 25 is a dynode that multiplies impinging electrons along the micro glass pipes 250 by the repeated collision of electrons on the inner walls and the emission of secondary electrons. The present invention can be applied to this configuration by the electron impinging surface 25*a,* having a positive potential in relation to the photocathode, of the microchannel plate 25 serving as the electron impinging section of the electron multiplying section.

Industrial Applicability

The photomultiplier tube, as one of the electron tubes according to the present invention, has a wide range of applications as a light analytical, apparatus for analyzing various matter using absorption, reflection, and polarization of specific wavelengths, in medical instruments, analytical instruments, industrial measuring instruments, and the like. The photomultiplier tube can also be used in x-rays; in instruments used to observe fixed stars, the sun, and auroras; and in apparatus used to measure environmental phenomena inside and outside the atmosphere.

What is claimed is:

1. An electron tube comprising:

a photocathode that emits electrons in response to incident light through photoelectric conversion;

an electron multiplying section that multiplies the electrons emitted from the photocathode, the electron multiplying section including an electron impinging section positioned nearest the photocathode, wherein the electrons emitted from the photocathode impinge on the electron multiplying section;

an ion confining electrode provided between the photocathode and the electron multiplying section for confining positive ions generated in the electron multiplying section; and an ion trap electrode provided between the ion confining electrode and the electron impinging section for capturing the positive ions confined by the ion confining electrode, wherein the potential of the ion confining electrode is set higher than the potential of the electron impinging section, and the potential of the ion trap electrode is set equal to or greater than the potential of the photocathode and set lower than the potential of the electron impinging section.

2. The electron tube as recited in claim 1, wherein the electron multiplying section includes a plurality of stages of dynodes, including a first stage dynode for capturing and orderly multiplying electrons emitted from the photocathode, the first stage dynode functioning as the electron impinging section.

3. The electron tube as recited in claim 1, wherein the electron multiplying section includes a microchannel plate having a plate structure formed of a plurality of bundled glass pipes, the microchannel plate having one surface opposing the photocathode, the one surface functioning as the electron impinging section.

4. The electron tube as recited in claim 1, further comprising an anode electrode that extracts the electrons multiplied by the electron multiplying section.

5. The electron tube as recited in claim 1, wherein the photocathode is formed from a semiconductor photoelectric conversion material.

6. The electron tube as recited in claim 5, wherein the semiconductor photoelectric conversion material is formed from gallium arsenic.

7. The electron tube as recited in claim 1, further comprising a focusing electrode disposed between the photocathode and the ion confining electrode for converging the electrons.

8. The electron tube as recited in claim 1, wherein each of the ion confining electrode and the ion trap electrode is formed with a row of a plurality of slits to allow photoelectrons to pass therethrough.

9. The electron tube as recited in claim 1, wherein each of the ion confining electrode and the ion trap electrode is formed with a plurality of channels forming a matrix pattern to allow photoelectrons to pass therethrough.

* * * * *